(12) United States Patent
Sato et al.

(10) Patent No.: US 6,893,163 B2
(45) Date of Patent: May 17, 2005

(54) OPTICAL CONNECTION SLEEVE, OPTICAL MODULE AND OPTICAL COMMUNICATION MODULE

(75) Inventors: Shunsuke Sato, Yokohama (JP); Toshio Mizue, Yokohama (JP); Ichiro Tonai, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 173 days.

(21) Appl. No.: 10/322,753

(22) Filed: Dec. 19, 2002

(65) Prior Publication Data

US 2003/0128937 A1 Jul. 10, 2003

(30) Foreign Application Priority Data

Dec. 19, 2001 (JP) ..................... P2001-386429

(51) Int. Cl.⁷ .................................. G02B 6/36
(52) U.S. Cl. ........................... 385/78; 385/77
(58) Field of Search ............... 385/78, 88, 89, 385/77

(56) References Cited

U.S. PATENT DOCUMENTS

| | | | | |
|---|---|---|---|---|
| 4,636,034 A | * | 1/1987 | Kashimura et al. | ........... 385/72 |
| 5,452,389 A | | 9/1995 | Tonai et al. | |
| 5,526,455 A | | 6/1996 | Akita et al. | |
| 5,528,408 A | * | 6/1996 | McGinley et al. | ........... 398/139 |
| 5,631,991 A | * | 5/1997 | Cohen et al. | ................ 385/93 |
| 5,737,465 A | | 4/1998 | Okochi | |
| 2001/0024551 A1 | | 9/2001 | Yonemura et al. | |

FOREIGN PATENT DOCUMENTS

| | | |
|---|---|---|
| DE | 19704341 | 8/1997 |
| EP | 0080722 A2 | 6/1983 |
| EP | 0826998 A2 | 3/1998 |
| EP | 0863419 A1 | 9/1998 |
| EP | 0887865 A1 | 12/1998 |
| JP | 02-170107 | 6/1990 |
| JP | 11-211940 | 8/1999 |
| JP | P2000-187137 A | 7/2000 |

* cited by examiner

Primary Examiner—John D. Lee
Assistant Examiner—Jennifer Doan
(74) Attorney, Agent, or Firm—McDermott Will & Emery LLP (57) ABSTRACT

A resin sleeve is used as an optical connection sleeve 1 for optically connecting an optical fiber 41 with an optical component. A ferrule fixing surface 21 provided on an inner peripheral surface of a ferrule insertion portion 2 of the sleeve 1 is formed to have a multifaceted shape in which a cross section thereof on a plane vertical to an optical axis A thereof has a hexagonal shape. A ferrule 40 can be positioned and fixed accurately by a tight fit utilizing elastic deformation of resin. An outer peripheral surface of the ferrule 40 and the ferrule fixing surface 21 come into line contact with each other, and thus detachability of the ferrule 40 is enhanced. Therefore, an optical fiber ferrule can be held accurately, and the optical connection sleeve having a satisfactory detachability, an optical module using the same and an optical communication module are realized.

9 Claims, 7 Drawing Sheets

OPTICAL CONNECTION SLEEVE, OPTICAL MODULE AND OPTICAL COMMUNICATION MODULE

BACKGROUND OF THE INVENTION

1. Field of the Invention

The present invention relates to an optical connection sleeve used in optical connection between an optical fiber and an optical component, to an optical module using the same and to an optical communication module.

2. Related Background of the Invention

In an optical communication system such as an optical data link and an optical LAN, in which light is used as an information transmission medium, information is transmitted by transmitting a light signal via an optical transmission path such as an optical fiber transmission path. In such an optical communication system, in order to receive or send the transmitted light signal, an optical communication module including an optical device which converts a light signal and an electric signal mutually is used.

In an optical module such as the foregoing optical communication module, an optical connection sleeve is provided in order to optically connect an optical fiber used for the optical transmission path and an optical component such as the optical device provided in the optical module. In such an optical connection sleeve, optical axes of the optical fiber and the optical device need to coincide with each other precisely in such a manner that a ferrule of a tip of the optical fiber, which is an object of the optical connection, is positioned and fixed with high accuracy with respect to a sleeve previously positioned with the optical device and the like.

As the optical connection sleeve which fixes an optical fiber ferrule with high accuracy as described above, for example, a precision sleeve is used. The precision sleeve is prepared so as to allow an inner diameter of a ferrule fixing surface provided on an inner peripheral surface of a ferrule insertion portion to coincide with an outer diameter of the ferrule with sufficient precision. Then, the optical fiber ferrule is inserted into the ferrule insertion portion, and the ferrule and the sleeve are positioned and fixed by a transition fit.

Moreover, similarly, as the optical connection sleeve which fixes the optical fiber ferrule with high accuracy, a split sleeve is used. The split sleeve is prepared so as to allow the inner diameter of the ferrule fixing surface to be smaller than the outer diameter of the ferrule. Then, the optical fiber ferrule is inserted into the ferrule insertion portion, and the ferrule and the sleeve are positioned and fixed by a tight fit.

SUMMARY OF THE INVENTION

Figure 7:
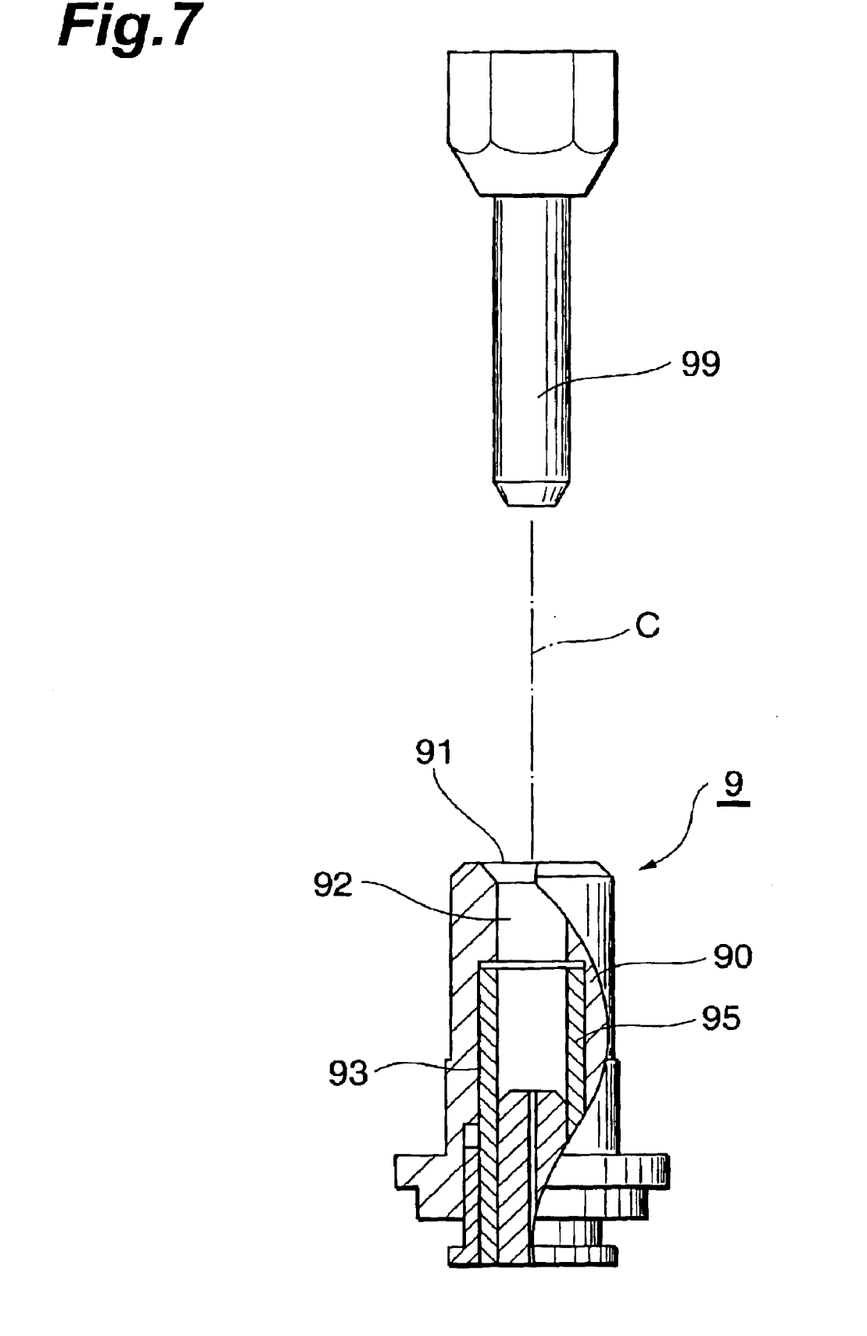
FIG. 7 is a perspective view showing a constitution of a conventional optical connection sleeve.

FIG. 7 is a perspective view showing an example of a constitution of an optical connection sleeve conventionally used in an optical module. An optical connection sleeve 9 shown in FIG. 7 is constituted of a first sleeve 90 located on an outer side thereof and a second sleeve 95 located on an inner side thereof. The first sleeve 90 is composed of a metal sleeve, and in its inner peripheral side, a ferrule insertion hole 92, in which a ferrule 99 including an optical fiber to be an object of optical connection is inserted, is provided, the ferrule insertion hole being formed so as to extend along an optical axis C from an opening 91 provided at one end portion thereof.

Moreover, in a part of an inner peripheral surface of the ferrule insertion hole 92, provided is a concave portion 93 in which its inner diameter is made large. The second sleeve 95 is set so as to be buried in this concave portion 93. The second sleeve 95 is composed of a precision sleeve or a split sleeve, which is made of, for example, ceramics. The ferrule 99 inserted from the opening 91 is positioned by this second sleeve 95 and fixed to the sleeve 9.

In the optical connection sleeve 9 having such a constitution, the optical fiber ferrule 99 can be positioned and fixed with high accuracy. However, since the optical connection sleeve 9 is constituted by combining the metal sleeve 90 subjected to machining and the sleeve 95 made of ceramics and subjected to high-precision processing, there is a problem that a cost of manufacturing respective sleeve parts and an assembly cost thereof become high.

In consideration for the above, as the optical connection sleeve used in the optical module, a sleeve made of resin has been considered in order to achieve cost reduction and mass production of the sleeve and the like. However, in the case of the optical connection sleeve having a constitution where the optical fiber ferrule is held by a transition fit, the resin sleeve is low in accuracy of preparing the ferrule insertion hole compared to the metal sleeve and the like. Thus, it is difficult to hold the ferrule with high accuracy.

Moreover, in the case of the optical connection sleeve having a constitution where the optical fiber ferrule is held by a tight fit, it is possible to hold the ferrule with high accuracy by use of the resin sleeve, which utilizes elastic deformation of resin. However, with the above constitution, the outer peripheral surface of the ferrule and the inner peripheral surface of the ferrule insertion hole of the sleeve come into face-contact with each other to be tightly fit therein. Thus, there is a problem that detachability of the ferrule with respect to the optical connection sleeve is bad.

The present invention is made for solving the above problems. An object of the present invention is to provide an optical connection sleeve, an optical module using the same and an optical communication module. Specifically, the optical connection sleeve can hold an optical fiber ferrule with high accuracy and has good detachability.

To achieve the above described object, the optical connection sleeve according to the present invention is (1) an optical connection sleeve which is formed taking an optical axis of optical connection as a central axis and is a resin-made sleeve for optically connecting an optical fiber inserted from one end portion with respect to the central axis with an optical component disposed on other end portion, and (2) the optical connection sleeve includes a ferrule insertion portion in which at least a part of an inner peripheral surface thereof serves as a ferrule fixing surface for positioning and fixing a ferrule which is provided on a tip of the optical fiber inserted as an object of optical connection from an opening, the ferrule insertion portion including the opening provided in the one end portion, (3) wherein a cross section of the ferrule fixing surface on a plane vertical to the optical axis has a polygonal shape surrounding the ferrule to be inserted, and a face shape of the ferrule fixing surface as a whole has a multifaceted shape constituted by N faces (N is an integer no fewer than 3) in which N sides in the polygonal cross section extend along the optical axis.

In the foregoing optical connection sleeve, a resin sleeve is used as an optical connection sleeve for optically connecting an optical fiber used for an optical transmission path and an optical component such as an optical device. By use of such a resin sleeve, the optical fiber ferrule can be sufficiently held with high positioning accuracy by a tight fit utilizing elastic deformation of resin. Moreover, by use of the resin sleeve, the cost reduction and mass production of the sleeve become possible as described above.

Moreover, the ferrule fixing surface, which is provided on the inner peripheral surface of the resin sleeve and positions ferrule, is formed in a multifaceted shape having a polygonal cross section. With such a constitution, the outer peripheral surface of the ferrule inserted into the resin sleeve and the ferrule fixing surface, which is the inner peripheral surface of the ferrule insertion hole, come into line contact with each other on respective faces of the multifaceted shape. Thus, the detachability of the ferrule with respect to the optical connection sleeve is enhanced. Accordingly, the ferrule of the optical fiber to be the object of the optical connection can be held with high accuracy, and the optical connection sleeve having a good detachability is realized.

In the above-described constitution, it is preferable that in the cross section of the ferrule fixing surface, a diameter of a circumscribed circle of its polygonal shape is larger than a diameter of the ferrule. Moreover, it is preferable that in the cross section of the ferrule fixing surface, a diameter of an inscribed circle of its polygonal shape is smaller than the diameter of the ferrule.

Furthermore, the optical module according to the present invention includes: (a) the optical connection sleeve described above; and (b) an optical device unit provided on the other end portion of the optical connection sleeve, (c) wherein the optical device unit has an optical device as the optical component optically connected to the optical fiber inserted from the opening on the one end portion, the optical device converting any one signal out of a light signal and an electric signal corresponding thereto to the other signal thereof.

Accordingly, the optical fiber in the ferrule, which is inserted into the optical connection sleeve and held therein, and the optical device that is the optical component, are connected optically with high accuracy, thus obtaining an optical module in which the detachability of the optical fiber ferrule is enhanced.

Furthermore, the optical communication module according to the present invention includes: a photodetector module that is the optical module described above, which has a photodetector device receiving a light signal, as the optical device, from the optical fiber; an electronic circuit for processing an electric signal outputted from the photodetector device; and a housing for integrally holding the photodetector module and the electronic circuit.

Alternatively, an optical communication module according to the present invention includes: a light emitting module that is the optical module described above, which has a light emitting device sending a light signal, as the optical device, to the optical fiber; an electronic circuit for supplying an electric signal inputted to the light emitting device; and a housing for integrally holding the light emitting module and the electronic circuit.

Still alternatively, an optical communication module according to the present invention includes: a photodetector module that is the optical module described above, which has a photodetector device receiving a light signal, as the optical device, from the optical fiber; an electronic circuit for reception which processes an electric signal outputted from the photodetector device; a light emitting module that is the optical module described above, which has a light emitting device sending a light signal, as the optical device, to the optical fiber; an electronic circuit for transmission which supplies an electric signal inputted to the light emitting device; and a housing for integrally holding the photodetector module, the electronic circuit for reception, the light emitting module and the electronic circuit for transmission.

Accordingly, in the case of applying the present invention to an optical communication system using the optical fiber transmission path, an optical communication module (a light receiving module, a light transmitting module and a light transceiver) capable of performing reception or transmission of a light signal with high efficiency is realized.

DESCRIPTION OF THE PREFERRED EMBODIMENTS

Hereinafter, detailed description will be made with accompanying drawings for preferred embodiments of an optical connection sleeve, an optical module and an optical communication module according to the present invention. Note that, in the description of the drawings, the same constituent components are denoted by the same reference numerals and symbols, and the repetitive description will be omitted. Moreover, dimension ratios in the drawings do not necessarily coincide with those in the description thereof.

Figure 1:
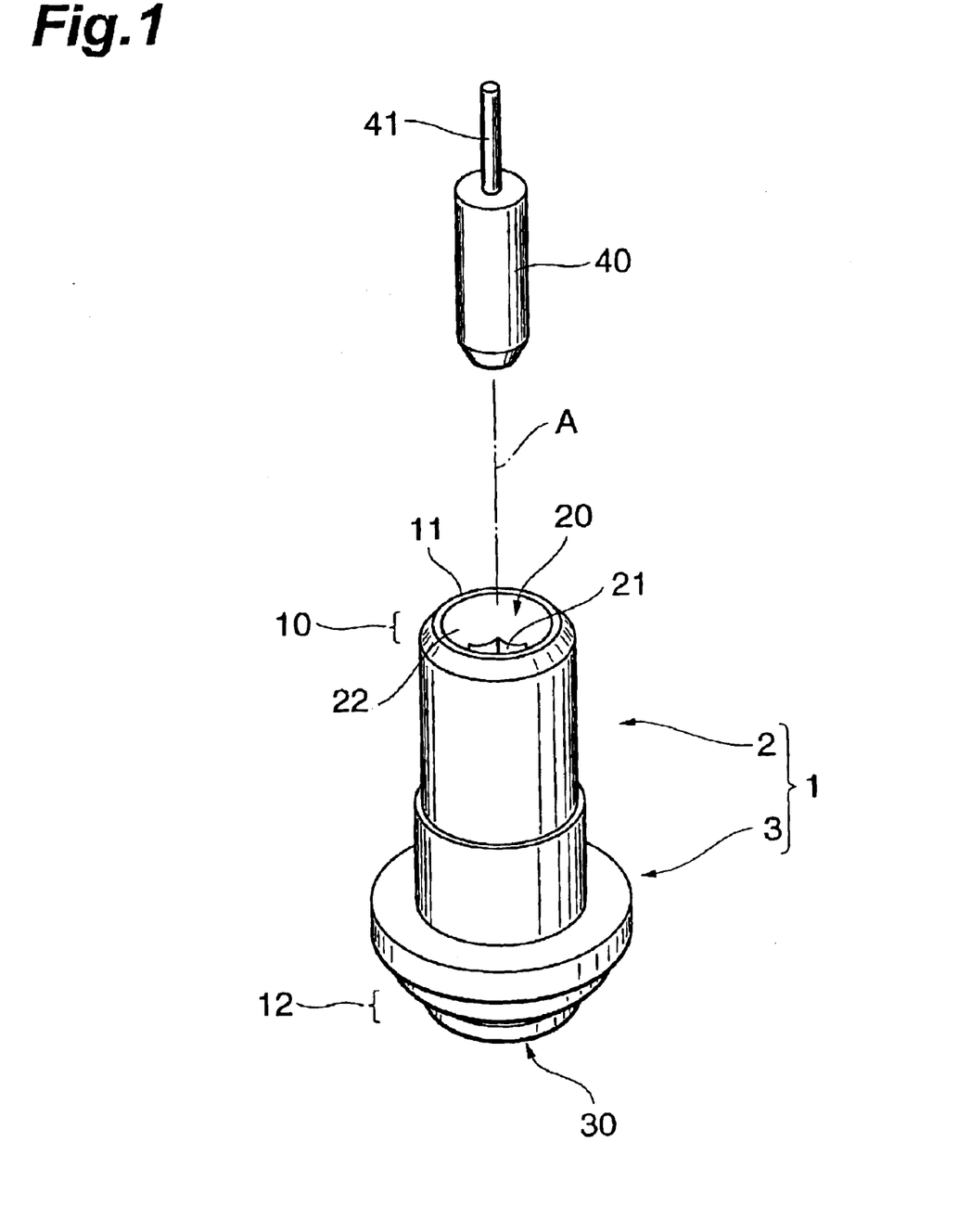
FIG. 1 is a perspective view showing a constitution of one embodiment of an optical connection sleeve.
Figure 2:
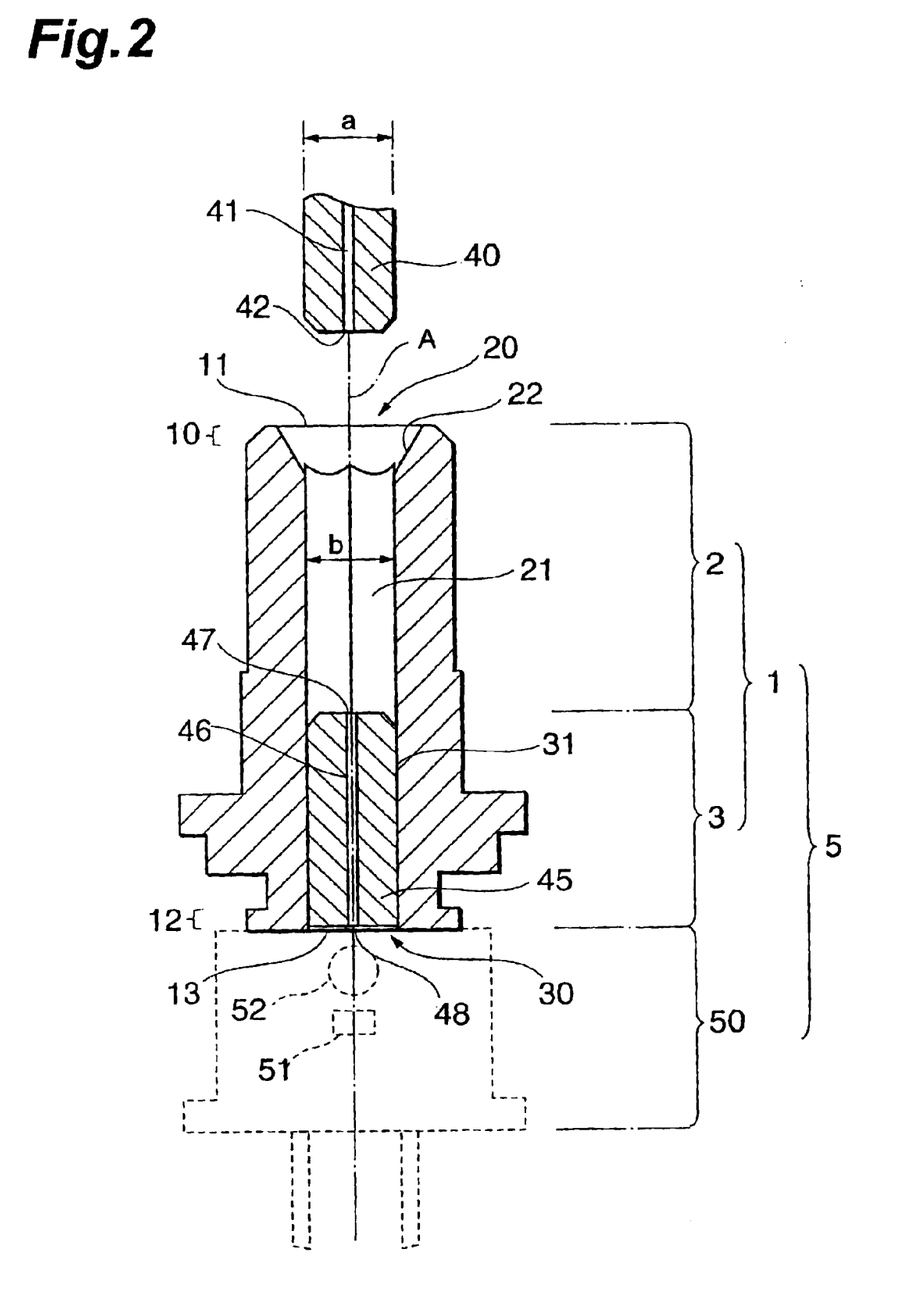
FIG. 2 is a cross sectional side view showing a cross-section structure in a plane including an optical axis of the optical connection sleeve shown in FIG. 1.

FIG. 1 is a perspective view showing a constitution of one embodiment of the optical connection sleeve according to the present invention. Moreover, FIG. 2 is a cross sectional side view showing a cross-section structure in a plane including an optical axis of the optical connection sleeve shown in FIG. 1.

An optical connection sleeve 1 is formed in such a manner that its basic shape as a whole is an approximately cylindrical shape taking an optical axis A of optical connection as a central axis. The optical connection sleeve 1 is a sleeve for optically connecting an optical fiber inserted from one end portion 10 to an optical component disposed on the other end portion 12. The optical connection sleeve 1 according to this embodiment is a resin sleeve, which is integrally molded as a whole by use of resin.

Herein, an optical fiber 41 to be an object of the optical connection in the optical connection sleeve 1 is an optical fiber used as, for example, an optical transmission path in an optical communication system using light as an information transmission medium. In this optical fiber 41, as shown in FIGS. 1 and 2, a ferrule 40 is provided on an outer peripheral surface of its tip.

The optical connection sleeve 1 is composed of: a ferrule insertion portion 2 including an opening 11 provided in the one end portion 10 with respect to the optical axis A; and an optical connection portion 3 including an opening 13 provided in the other end portion 12. The ferrule insertion portion 2 and the optical connection portion 3 are integrally molded by use of resin as described above.

In an inner side of the ferrule insertion portion 2, a ferrule insertion hole 20 is provided, which extends along the optical axis A from the opening 11. A large portion of the inner peripheral surface of the ferrule insertion portion 2, which faces the ferrule insertion hole 20, constitutes a ferrule fixing surface 21. This ferrule fixing surface 21 is one for positioning the ferrule 40 with respect to the sleeve 1 and fixing the same thereon, the ferrule 40 being provided on the tip of the optical fiber 41 inserted into the ferrule insertion hole 20. Moreover, a part of the inner peripheral surface of the ferrule insertion portion 2, the part being located in the vicinity of the opening 11, constitutes a taper portion 22 for guiding the ferrule 40 inserted from the opening 11 into the ferrule insertion hole 20.

Meanwhile, in the optical connection portion 3, an optical fiber 46 is provided as an optical waveguide extending along the optical axis A. This optical fiber 46 is an optical waveguide for optical connection, which is provided for optically connecting the optical fiber 41 inserted as the object of the optical connection from the opening 11 on the end portion 10 with the optical component disposed in the vicinity of the opening 13 on the end portion 12.

In this embodiment, in the inner side of the optical connection portion 3, a ferrule housing hole 30 extending along the optical axis A from the opening 13 is provided. This ferrule housing hole 30 is constituted so as to communicate with the ferrule insertion hole 20 of the ferrule insertion portion 2. Moreover, an inner peripheral surface of the optical connection portion 3, which faces the ferrule housing hole 30, constitutes a ferrule fixing surface 31. This ferrule fixing surface 31 and the ferrule fixing surface 21 of the ferrule insertion portion 2 constitute a continuous surface.

Inside the ferrule housing hole 30, the foregoing optical fiber 46 for optical connection is previously housed together with a ferrule 45 provided on its outer peripheral surface. According to the above-described constitution, the optical fiber 46 for optical connection is positioned with respect to the optical connection sleeve 1 and fixed therein via the ferrule 45 and the ferrule fixing surface 31.

In the above-described constitution, when the ferrule 40 including the optical fiber 41 is inserted into the ferrule insertion hole 20 of the ferrule insertion portion 2 from the opening 11, a connection face 42 that is an end face of the optical fiber 41, which is on the central axis of the ferrule 40, and one end face 47 of the optical fiber 46, which is on the central axis of the ferrule 45 provided in the optical connection portion 3, physically come into contact with each other. Accordingly, the optical fiber 41, which is the object of the optical connection, and the optical fiber 46 for optical connection are optically connected with each other.

Herein, it is considered that the optical component is disposed at a predetermined position in the vicinity of the opening 13 of the optical connection portion 3, the position facing the other end face 48 of the optical fiber 46 along the optical axis. In this event, the optical fiber 41 inserted from the opening 11 of the sleeve 1, the optical fiber 46 for optical connection and the optical component disposed on the opening 13 side are disposed along the optical axis A. Accordingly, the optical fiber 41 and the optical component are optically connected with each other via the optical fiber 46 that is the optical waveguide for optical connection.

Figure 3:
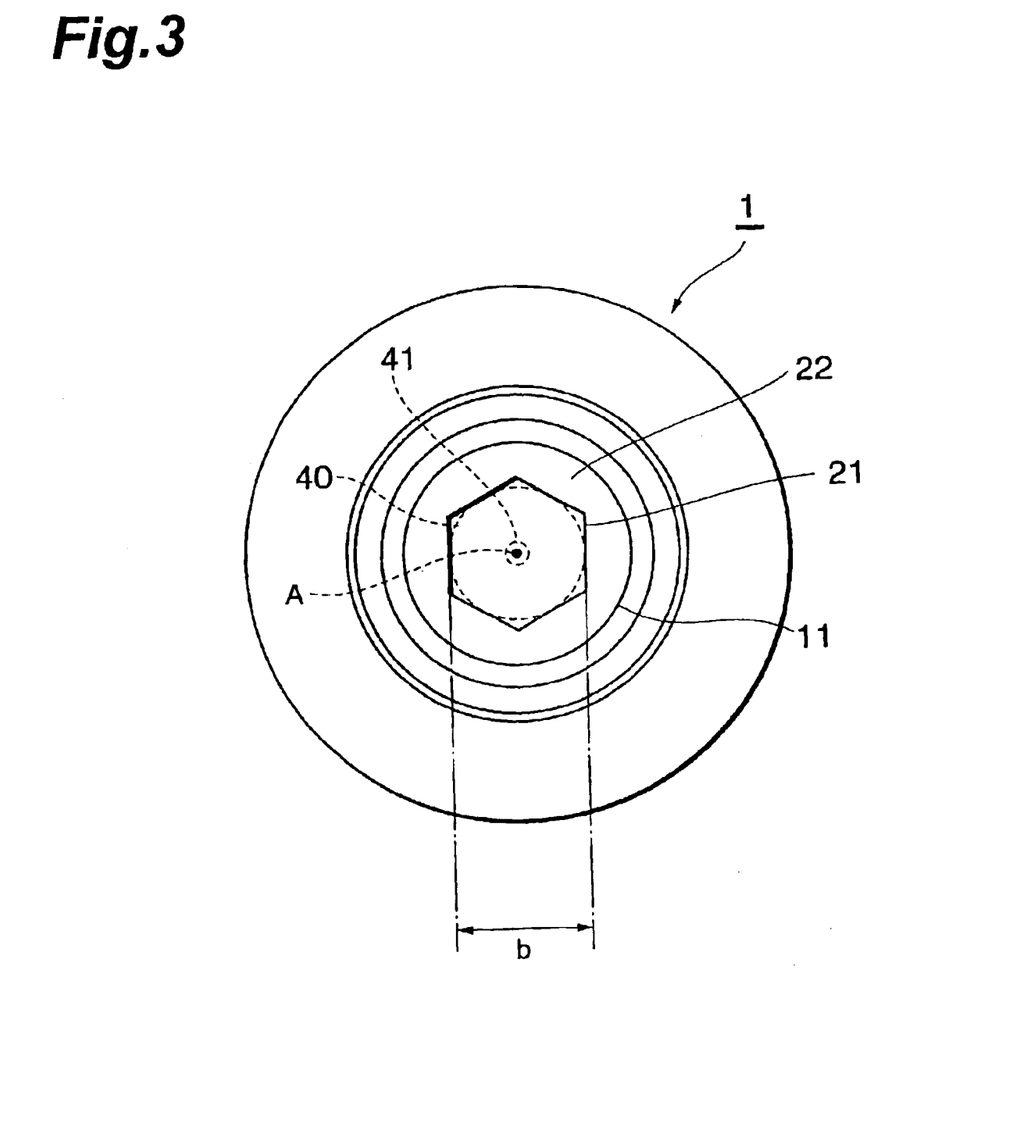
FIG. 3 is a plane view in which the optical connection sleeve shown in FIG. 1 is viewed from an insertion direction of an optical fiber ferrule.

A constitution of the ferrule insertion portion 2 in the optical connection sleeve 1 of this embodiment will be further described. FIG. 3 is a plane view in which the optical connection sleeve shown in FIG. 1 is viewed from an insertion direction of an optical fiber ferrule.

In the optical connection sleeve 1 of this embodiment, as to the ferrule fixing surface 21 provided on the inner peripheral surface of the ferrule insertion portion 2, as shown in FIG. 3, a cross section of the ferrule fixing surface 21 on a plane vertical to the optical axis A has a regular hexagonal shape surrounding the approximately cylindrical ferrule 40 inserted into the ferrule insertion hole 20. Then, a face shape of the ferrule fixing surface 21 on the whole is a hexahedron shape constituted by six faces, in which six sides of the regular hexagon in the above cross section extend along the optical axis A, respectively (see the cross section of FIG. 2).

Moreover, in the hexagonal shape of the above ferrule fixing surface 21, a distance b between opposing faces, which corresponds to a minimum value of an inner diameter of the ferrule fixing surface, is set to be somewhat smaller than an outer diameter a of the ferrule 40 to be inserted therein. Accordingly, when being inserted into the ferrule insertion hole 20, the ferrule 40 including the optical fiber 41 to be the object of the optical connection is positioned and fixed therein by the tight fit. In FIG. 3, however, the distance b is illustrated as equal to the diameter a.

Description will be made for an effect of the optical connection sleeve 1 having the foregoing constitution.

In the optical connection sleeve 1 of this embodiment, a sleeve made of resin is used as the optical connection sleeve 1 for optically connecting the optical fiber 41 used as an optical transmission path and the optical component such as an optical device. By use of such a resin sleeve, the optical fiber ferrule 40 can be thoroughly held with high positioning accuracy by the tight fit utilizing the elastic deformation of resin.

Moreover, manufacturing of the resin sleeve is easy compared with the metal sleeve, the precision sleeve made of ceramics, the split sleeve or the like, and its manufacturing cost is also low. Furthermore, by integral molding of the sleeve by use of resin, the number of parts thereof can be reduced. Thus, the manufacturing cost and assembly cost thereof are reduced. Therefore, by use of the optical connection sleeve 1 made of resin, the cost reduction and mass production of the sleeve are made possible.

The ferrule fixing surface 21, which is provided on the inner peripheral surface of the resin sleeve 1 and positions the ferrule 40, is formed to have a multifaceted shape in which the cross section thereof is polygonal composed of N sides (N is an integer no fewer than 3, N=6 in the foregoing embodiment).

With the above-described constitution, the outer peripheral surface of the ferrule 40 inserted into the resin sleeve 1 and the ferrule fixing surface 21, which is the inner peripheral surface of the ferrule insertion hole 20, come into line contact with each other on the respective faces of the multifaceted shape. In this event, a contact area is reduced compared with the case where the outer peripheral surface of the ferrule 40 and the ferrule fixing surface 21 come into face contact with each other, and thus the detachability of the ferrule 40 to the optical connection sleeve 1 is enhanced.

According to the above, the ferrule 40 of the optical fiber 41 to be the object of the optical connection can be held with high accuracy, and the optical connection sleeve 1 having sufficient detachability is realized.

Herein, in the foregoing constitution in which the ferrule fixing surface 21 has the multifaceted shape, it is preferable that the number of faces N in the multifaceted shape is an integer no fewer than 3, nor more than 8 ($3 \leq N \leq 8$). In such a manner, by use of the optical connection sleeve 1 having the ferrule fixing surface 21 of the multifaceted shape in which the cross section thereof has 3 to 8 sides, the holding of the optical fiber ferrule 40 with high accuracy and the sufficient detachability of the ferrule 40 can be both suitably achieved. In such a case, particularly, as described in the foregoing embodiment, it is preferable that the number of faces in the ferrule fixing surface 21 having the multifaceted shape is set to N=6 and that the cross section thereof has the hexagonal shape such as a regular hexagon.

Moreover, the ferrule fixing surface 21 is preferably formed in a taper shape in which the area in the ferrule insertion hole 20, which is surrounded by the polygonal cross section in the plane vertical to the optical axis A, becomes smaller toward the other end portion 12 from the one end portion 10. Accordingly, the optical fiber ferrule 40 can be thoroughly held by the tight fit with higher accuracy. Here, the ferrule fixing surface 21 may be formed so that the area in the ferrule insertion hole 20 becomes constant.

Moreover, in the foregoing constitution, it is preferable that, as shown in FIG. 3, in the cross section of the ferrule fixing surface 21, the diameter of the circumscribed circle of the polygonal shape is larger than the diameter of the ferrule 40. As described regarding the distance b in the ferrule fixing surface 21 and the outer diameter a of the ferrule 40, it is preferable that, in the cross section of the ferrule fixing surface 21, the diameter of the inscribed circle of the polygonal shape is smaller than the diameter of the ferrule 40. According to the constitutions described above, the ferrule 40 can be suitably positioned and fixed in the ferrule insertion hole 20.

Note that, in the optical connection sleeve holding the ferrule by the transition fit or the tight fit, when the optical fiber ferrule is inserted into the sleeve, the air inside the ferrule insertion hole of the sleeve needs to be released therefrom. In the foregoing optical connection sleeve 1 in which the ferrule fixing surface 21 inside the ferrule insertion hole 20 has a multifaceted shape, a clearance is made between the ferrule 40 and the ferrule fixing surface 21 other than the portion coming into line contact with the ferrule 40. Thus, an air releasing hole and the like need not to be separately provided.

Moreover, considering the precision of manufacturing the optical connection ferrule 1 made of resin, in the resin-molded parts, there is a variation of several $\mu$m even in the case of manufacturing thereof with high accuracy. Here, when the cross section of the ferrule fixing surface in the resin sleeve is circle, even if an interference of about 4 $\mu$m exists between the diameters of the ferrule and the sleeve, there is no significant influence on the attaching/detaching of the ferrule to/from the sleeve. However, in the case of designing the interference to be about 4 $\mu$m as described above, a sufficient tight fit cannot be achieved in some cases depending on the variation in the precision of manufacturing the resin-made parts.

On the contrary, in the case where the cross section of the ferrule fixing surface in the resin sleeve is polygonal, the contact area between the sleeve and the ferrule is reduced, thus making it possible to have a large interference compared to the case of the circle cross section. In other words, even when the interference is larger than 4 $\mu$m, the optical connection sleeve in which the detachability of the ferrule with respect to the sleeve is satisfactorily maintained can be obtained.

Herein, a concrete diameter of the ferrule will be cited. When a ferrule of $\phi$ 1.25 mm is used, an outer diameter of the ferrule is in the range of $\phi$ 1.2485 mm to 1.2495 mm. Moreover, when a ferrule of $\phi$ 2.5 mm is used, an outer diameter of the ferrule is in the range of $\phi$ 2.4985 mm to 2.4995 mm.

Figure 4A:
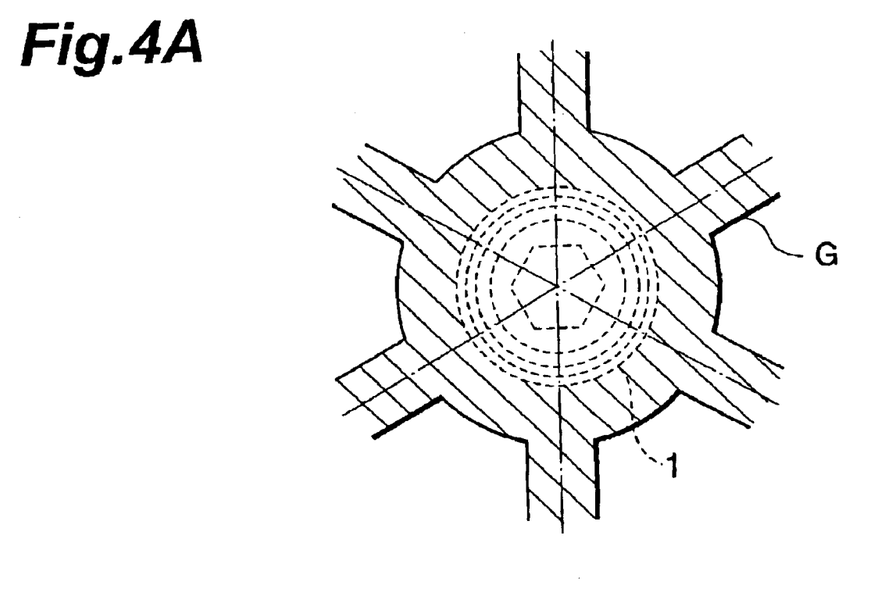
FIGS. 4A and 4B are schematic views showing a method of manufacturing the optical connection sleeve shown in FIG. 1.
Figure 4B:
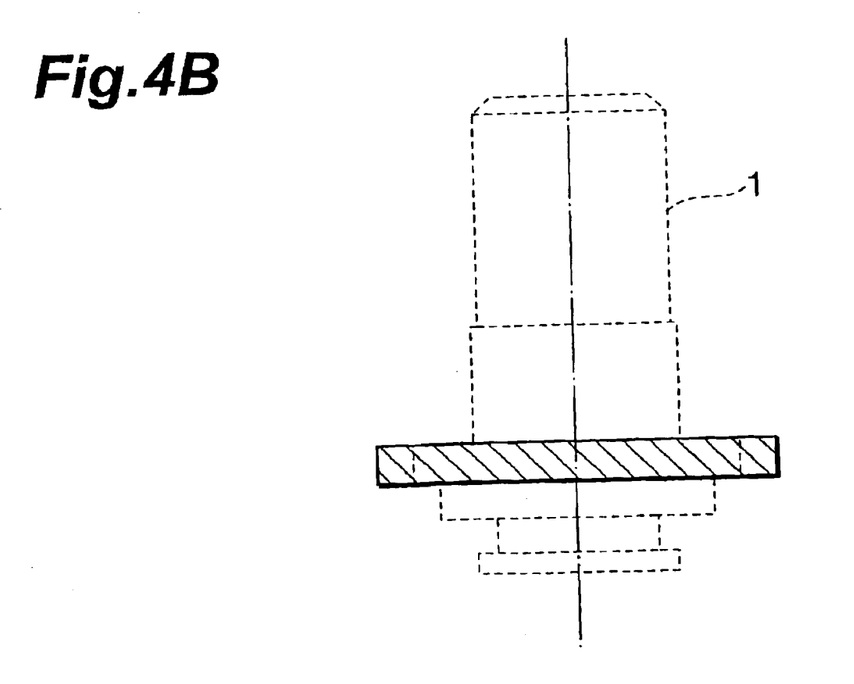

As a manufacturing method of the above-described resin sleeve having a polygonal cross section, for example, a method as shown in FIGS. 4A and 4B is conceivable. FIGS. 4A and 4B are views schematically showing a method of manufacturing the optical connection sleeve shown in FIG. 1. FIG. 4A is a plan view thereof, and FIG. 4B is a side view thereof. When gates, which are necessary in resin molding of the sleeve, are provided on the whole in a circumferential direction thereof, a cross section of a cylindrical portion of the ferrule insertion hole becomes circle having high precision.

On the other hand, the gates for the resin molding are made to be multipoint gates, and thus a resin sleeve in which the cross section of the cylindrical portion is polygonal can be suitably manufactured. In FIGS. 4A and 4B, as an example of the method of manufacturing such a resin sleeve, description is made for the resin molding in which six point gates G are provided so that the cross section of the inner peripheral surface of the ferrule insertion hole becomes hexagonal.

Herein, to the optical connection sleeve 1 shown in FIGS. 1 to 3, an optical device is set as an optical component optically connected to the optical fiber 41 as an optical transmission path via the optical fiber 46 provided for optical connection, the optical device converting one signal out of a light signal and an electric signal corresponding thereto to the other signal thereof. Thus, an optical module such as a photodetector module, a light emitting module and the like can be obtained.

In FIG. 2, as a constitution example of such an optical module, an optical device unit 50 having an optical device 51 and a lens 52 is shown by a dotted line. In this constitution example, the optical device unit 50 is fixedly set on the end portion 12 of the optical connection sleeve 1 in such a manner that optical axes of the optical device 51 and the lens 52 precisely coincide with the optical axis A in the optical connection sleeve 1.

As described above, the optical module is constituted by the optical connection sleeve 1, which is made of resin and has the above-described constitution, and the optical device unit 50 having the optical device 51. Thus, a satisfactory optical module 5 is obtained. Specifically, according to this optical module 5, when the ferrule 40 including the optical fiber 41 as the optical transmission path is inserted into the optical connection sleeve 1, the optical fiber 41 and the optical device 51 are optically connected with each other in a state where the optical axes of the both precisely coincide with each other. Moreover, since the ferrule fixing surface 21 in the optical connection sleeve 1 is made to have a polygonal shape, the optical module 5 in which the detachability of the optical fiber ferrule 40 is enhanced can be obtained.

When a photodetector device receiving a light signal is applied as the optical device 51, for example, the optical module 5 becomes a photodetector module capable of optically connecting with high accuracy the optical fiber 41 as the optical transmission path and the photodetector device 51 by the optical connection sleeve 1. When the optical fiber 41 is connected to this photodetector module 5, the light signal inputted from the optical fiber 41 to the photodetector module 5 is received with high efficiency by the photodetector device 51 via the optical fiber 46 for optical connection.

Moreover, when a light emitting device sending a light signal is applied as the optical device 51, the optical module 5 becomes a light emitting module capable of optically connecting with high accuracy the optical fiber 41 as the optical transmission path and the light emitting device 51 by the optical connection sleeve 1. When the optical fiber 41 is connected to this light emitting module 5, the light signal outputted from the light emitting device 51 is sent with high efficiency to the optical fiber 41 from the light emitting module 5 via the optical fiber 46 for optical connection.

Next, description will be made for an optical communication module using the optical connection sleeve and the optical module of the above-described embodiment.

Figure 5:
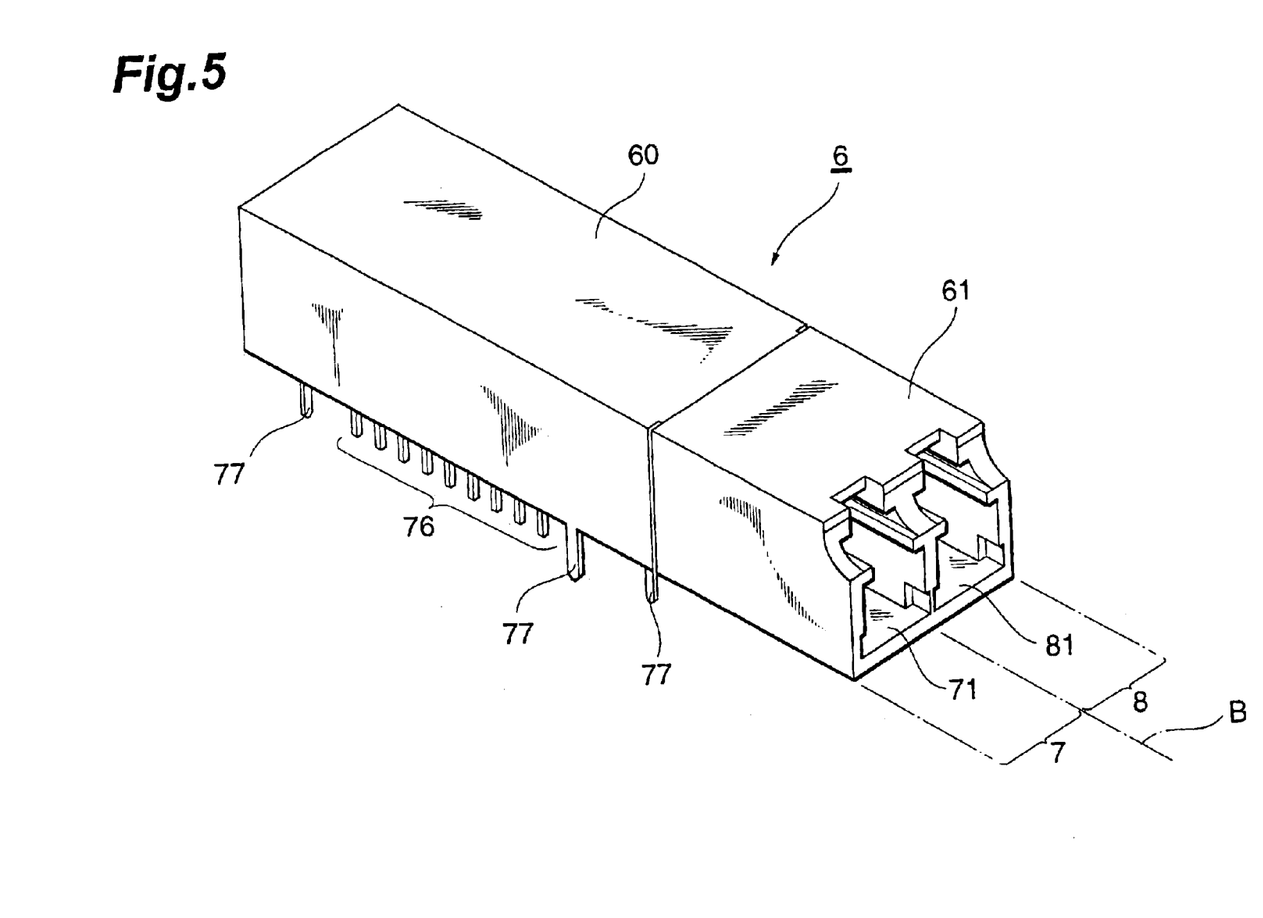
FIG. 5 is a perspective view showing a constitution of one embodiment of an optical communication module.
Figure 6:
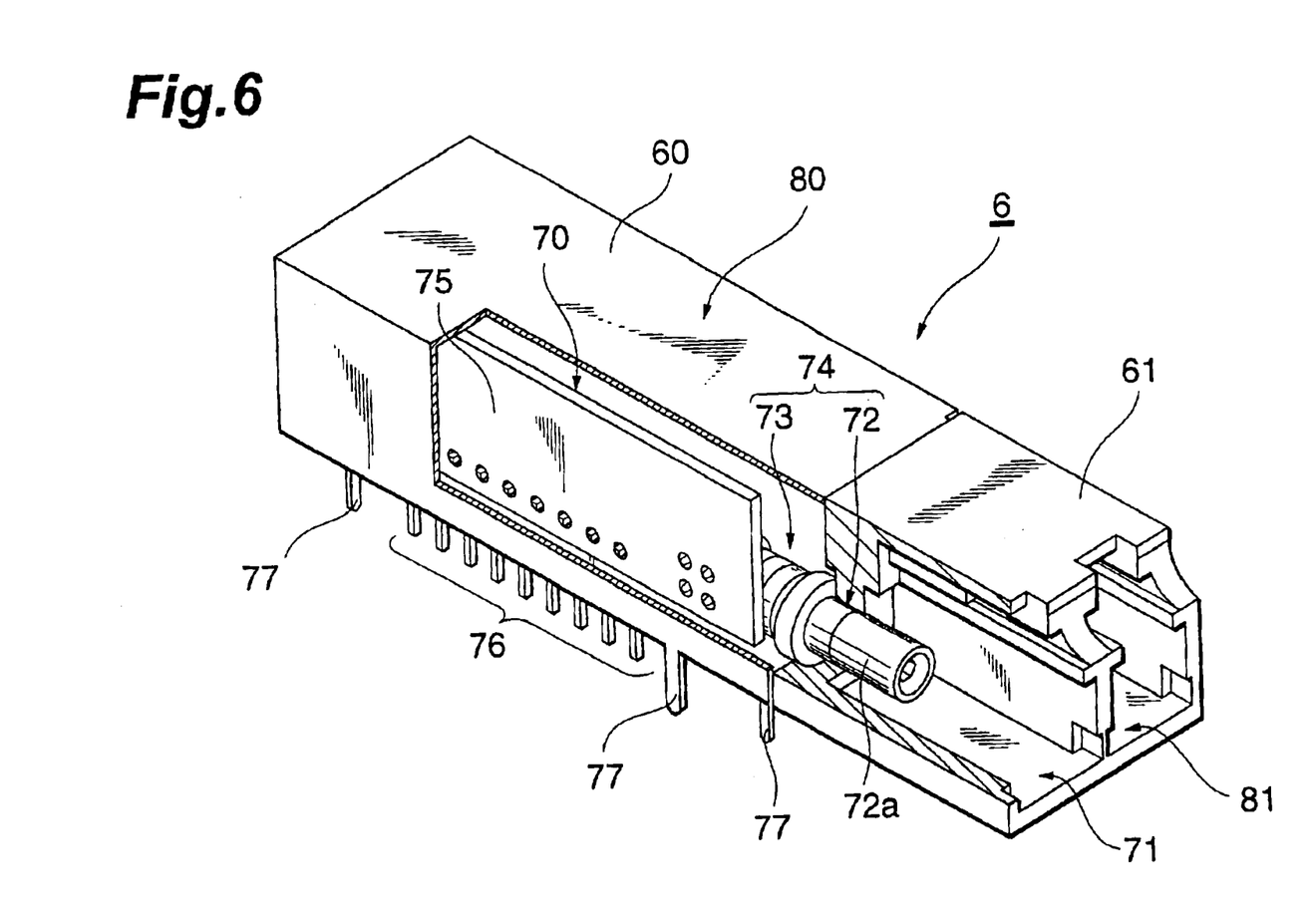
FIG. 6 is a perspective view showing an internal structure of the optical communication module shown in FIG. 5, which is partially fractured.

FIG. 5 is a perspective view showing a constitution of one embodiment of an optical communication module according to the present invention. FIG. 6 is a perspective view showing an internal structure of the optical communication module shown in FIG. 5, which is partially fractured.

The optical communication module shown in FIGS. 5 and 6 is an optical transceiver 6 including the photodetector module and the light emitting module, which includes two optical communication module units divided along an axis B to be a direction of connecting the optical fiber into a first optical communication module unit 7 and a second optical communication module unit 8. Hereinafter, as an example, the first optical communication module unit 7 is set as a light receiving module unit, and the second optical communication module unit 8 as a light transmitting module unit.

A housing of the optical transceiver 6 is constituted by: a housing body 60 for housing the optical module including the optical connection sleeve and the like; and an optical receptacle 61 for detachably engaging an optical connector including the optical fiber to be the object of the optical connection and the ferrule provided at the tip of the optical fiber. In FIG. 6, the housing body 60 and the optical receptacle 61 are partially fractured, thus showing an internal structure of the light receiving module unit 7 that is the first optical communication module unit.

A part of the housing body 60 at the side of the light receiving module unit 7 constitutes a first housing unit 70 for housing the photodetector module and the like. Moreover, a part of the optical receptacle 61 at the side of the light receiving module unit 7 constitutes a first receptacle unit 71 for attaching/detaching the optical connector for connecting the optical fiber inputting the light signal to the optical transceiver 6.

In the first housing unit 70, housed is a photodetector module 74 composed of an optical connection sleeve 72 having the constitution shown in FIG. 1 and a photodetector device unit 73 having the photodetector device. Moreover, the optical connection sleeve 72 is set in such a manner that a ferrule insertion portion 72a protrudes into the receptacle unit 71 along the optical axis of the optical connection.

Accordingly, when the optical connector is fitted to the receptacle unit 71, the ferrule of the optical fiber included in the optical connector is inserted into the ferrule insertion portion 72a of the optical connection sleeve 72, thus optically connecting the optical fiber with the photodetector device included in the photodetector device unit 73.

Moreover, in the housing unit 70, housed is a wiring board 75 having an electronic circuit for reception which performs processing of an electric signal outputted from the photodetector device of the photodetector device unit 73. The electronic circuit provided in this wiring board 75 is electrically connected to the photodetector device unit 73. Moreover, in a lower part of the housing unit 70, provided are: external terminals 76 for use in inputting/outputting of the electric signal to/from the electronic circuit for reception of the wiring board 75; and studs 77 including those for grounding.

The first optical communication module unit 7 is constituted by: the photodetector module 74 composed of the optical connection sleeve 72 and the photodetector device unit 73; the wiring board 75 including the electronic circuit for reception; and the first housing unit 70 that is the housing for integrally holding the foregoing components. This optical communication module unit 7 is a light receiving module in which a light signal from the optical fiber connected by the optical connector fitted to the receptacle unit 71 is received by the photodetector device of the photodetector device unit 73 via the optical connection sleeve 72.

Moreover, a part of the housing body 60 at the side of the light transmitting module unit 8 constitutes a second housing unit 80 for housing the light emitting module and the like. A part of the optical receptacle 61 at the side of the light transmitting module unit 8 constitutes a second receptacle unit 81 for attaching/detaching the optical connector for connecting the optical fiber outputting the light signal from the optical transceiver 6.

In the second housing unit 80, housed is a light emitting module (not shown) composed of the optical connection sleeve having the constitution shown in FIG. 1 and a light emitting device unit having the light emitting device. Moreover, the optical connection sleeve is set in such a manner that the ferrule insertion portion protrudes into the receptacle unit 81 along the optical axis of the optical connection.

Accordingly, when the optical connector is fitted to the receptacle unit 81, the ferrule of the optical fiber included in the optical connector is inserted into the ferrule insertion portion of the optical connection sleeve, thus optically connecting the optical fiber with the light emitting device included in the light emitting device unit.

Moreover, in the housing unit 80, housed is a wiring board having an electronic circuit for transmission which supplies an electric signal inputted to the light emitting device of the light emitting device unit. The electronic circuit provided in this wiring board is electrically connected to the light emitting device unit. Moreover, in a lower part of the housing unit 80, provided are: external terminals for use in inputting/outputting of the electric signal to/from the electronic circuit for transmission of the wiring board; and studs including those for grounding.

The second optical communication module unit 8 is constituted by: the light emitting module composed of the optical connection sleeve and the light emitting device unit; the wiring board including the electronic circuit for transmission; and the second housing unit 80 that is the housing for integrally holding the foregoing components. This optical communication module unit 8 is a light transmitting module in which a light signal supplied from the light emitting device of the light emitting device unit is sent to the optical fiber connected by the optical connector fitted to the receptacle unit 81 via the optical connection sleeve.

As described above, the optical transceiver 6 is constituted by using the photodetector module and the light emitting module, both of which include the resin-made optical connection sleeve having the above-described constitution. Thus, a satisfactory optical communication module can be obtained. According to this optical transceiver 6, when the optical transceiver is applied in the optical communication system using the optical fiber transmission path, the light signal can be received or transmitted with high efficiency.

The optical connection sleeve, the optical module and the optical communication module according to the present invention are not limited to those described in the foregoing embodiment, but various modifications thereof are possible. For example, in the optical connection sleeve 1 shown in FIG. 1, in order to optically connect the optical fiber 41 on the end portion 10 with the optical component on the end portion 12, the optical fiber 46 previously fixed to the sleeve 1 is used as the optical waveguide for optical connection. As to the optical fiber 46, in the case where the optical fiber to be the object of the optical connection and the optical device can be optically connected to each other directly, a constitution may be adopted, in which the waveguide for optical connection is not provided.

Moreover, as to the optical communication module, besides the optical transceiver shown in FIG. 5, which includes the photodetector module and the light emitting module, the optical connection sleeve with the foregoing constitution can be applied to various other optical communication modules. As such an optical communication module, for example, enumerated are: a light receiving module in which a photodetector module and an electronic circuit for reception are integrally held by a housing; a light transmitting module in which a light emitting module and an electronic circuit for transmission are integrally held by a housing; and the like.

The optical connection sleeve, the optical module and the optical communication module according to the present invention can hold the optical fiber ferrule with high accuracy and can be utilized as the optical connection sleeve having a satisfactory detachability, the optical module using the same and the optical communication module.

Specifically, according to the optical connection sleeve with the constitution in which the resin sleeve is used and the ferrule fixing surface for positioning and fixing the optical fiber ferrule has a multifaceted shape, the ferrule fixing surface being provided on the inner peripheral surface of the sleeve, the optical fiber ferrule can be satisfactorily held with high positioning accuracy by the tight fit utilizing the elastic deformation of resin.

Moreover, the outer peripheral surface of the ferrule inserted into the resin sleeve and the ferrule fixing surface that is the inner peripheral surface of the ferrule insertion hole come into line contact with each other on the respective faces of the multifaceted shape. Thus, the detachability of the ferrule with respect to the optical connection sleeve is enhanced. Accordingly, the ferrule of the optical fiber to be the object of the optical connection can be held with high accuracy, and the optical connection sleeve having the satisfactory detachability is realized.

What is claimed is:

1. An optical connection sleeve which is formed taking an optical axis of optical connection as a central axis and is a resin-made sleeve for optically connecting an optical fiber inserted from one end portion with respect to the central axis with an optical component disposed on other end portion, comprising:

a ferrule insertion portion in which at least a part of an inner peripheral surface thereof serves as a ferrule fixing surface for positioning and fixing a ferrule which is provided on a tip of the optical fiber inserted as an object of optical connection from an opening, said ferrule insertion portion including the opening provided in the one end portion, wherein a cross section of said ferrule fixing surface on a plane vertical to the optical axis has a polygonal shape surrounding the ferrule to be inserted, and a face shape of the ferrule fixing surface as a whole has a multifaceted shape constituted by N faces (N is an integer no fewer than 3) in which N sides in the polygonal cross section extend along the optical axis, and in the cross section of said ferrule fixing surface, a diameter of a circumscribed circle of the polygonal shape is larger than a diameter of the ferrule, and a diameter of an inscribed circle of the polygonal shape is smaller than a diameter of the ferrule, in a condition that the ferrule is not inserted into the ferrule insertion portion.

2. The optical connection sleeve according to claim 1, wherein the number N of faces in said ferrule fixing surface having the multifaceted shape is an integer no fewer than 3, nor more than 8.

3. The optical connection sleeve according to claim 2, wherein the number N of the faces in said ferrule fixing surface having the multifaceted shape is N=6.

4. The optical connection sleeve according to claim 1, wherein said ferrule fixing surface is formed in a taper shape, in which an area surrounded by the polygonal cross section in the plane vertical to the optical axis is sequentially reduced toward the other end portion from the one end portion.

5. An optical module comprising:

the optical connection sleeve according to claim 1; and an optical device unit provided on the other end portion of said optical connection sleeve, wherein said optical device unit has an optical device as the optical component optically connected to the optical fiber inserted from the opening on the one end portion, the optical device converting any one signal out of a light signal and an electric signal corresponding thereto to the other signal thereof.

6. An optical communication module comprising:

a photodetector module that is the optical module according to claim 5, which has a photodetector device receiving a light signal, as the optical device, from the optical fiber;

an electronic circuit for processing an electric signal outputted from the photodetector device; and a housing for integrally holding said photodetector module and said electronic circuit.

7. An optical communication module comprising:

a light emitting module that is the optical module according to claim 5, which has a light emitting device sending a light signal, as the optical device, to the optical fiber;

an electronic circuit for supplying an electric signal inputted to the light emitting device; and a housing for integrally holding said light emitting module and said electronic circuit.

8. An optical communication module comprising:

a photodetector module that is the optical module according to claim 5, which has a photodetector device receiving a light signal, as the optical device, from the optical fiber, an electronic circuit for reception which processes an electric signal outputted from the photodetector device;

a light emitting module that is the optical module according to claim 5, which has a light emitting device sending a light signal, as the optical device, to the optical fiber;

an electronic circuit for transmission which supplies an electric signal inputted to the light emitting device; and a housing for integrally holding said photodetector module, said electronic circuit for reception, said light emitting module and said electronic circuit for transmission.

9. An optical connection sleeve which is formed taking an optical axis of optical connection as a central axis and is a resin-made sleeve for optically connecting an optical fiber inserted from one end portion with respect to the central axis with an optical component disposed on other end portion, comprising:

a ferrule insertion portion in which at least a part of an inner peripheral surface thereof serves as a ferrule fixing surface for positioning and fixing a ferrule which is provided on a tip of the optical fiber inserted as an object of optical connection from an opening, said ferrule insertion portion including the opening provided in the one end portion, wherein a cross section of said ferrule fixing surface on a plane vertical to the optical axis has a polygonal shape surrounding the ferrule to be inserted, and a face shape of the ferrule fixing surface as a whole has a multifaceted shape constituted by N faces (N is an integer no fewer than 3) in which N sides in the polygonal cross section extend along the optical axis, and in the cross section of said ferrule fixing surface, a diameter of an inscribed circle of the polygonal shape is smaller than a diameter of the ferrule in a condition that the ferrule is not inserted into the ferrule insertion portion.

* * * * *